US011303905B2

(12) United States Patent
Iwata et al.

(10) Patent No.: US 11,303,905 B2
(45) Date of Patent: Apr. 12, 2022

(54) INFORMATION PROCESSING SYSTEM AND INFORMATION PROCESSING METHOD

(71) Applicant: FUJITSU LIMITED, Kawasaki (JP)

(72) Inventors: Satoshi Iwata, Yokohama (JP); Masahisa Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 16/674,044

(22) Filed: Nov. 5, 2019

(65) Prior Publication Data
US 2020/0162744 A1 May 21, 2020

(30) Foreign Application Priority Data
Nov. 21, 2018 (JP) .............................. JP2018-218053

(51) Int. Cl.
G06K 9/36 (2006.01)
H04N 19/159 (2014.01)
H04N 19/172 (2014.01)
H04N 19/115 (2014.01)

(52) U.S. Cl.
CPC ......... H04N 19/159 (2014.11); H04N 19/115 (2014.11); H04N 19/172 (2014.11)

(58) Field of Classification Search
CPC .. H04N 19/159; H04N 19/172; H04N 19/115; H04N 19/184; H04N 19/44; H04N 19/137; H04N 19/17; H04N 19/46; H04N 19/119
USPC ........................................................ 382/238
See application file for complete search history.

(56) References Cited

U.S. PATENT DOCUMENTS

| 5,778,023 | A | * | 7/1998 | Ideta | H04B 1/707 375/150 |
| 7,453,594 | B2 | * | 11/2008 | Bessho | H04N 1/64 358/1.13 |
| 7,505,982 | B2 | * | 3/2009 | Wang | G06F 3/03545 |
| 9,235,612 | B1 | * | 1/2016 | Tidwell | G06F 16/2282 |
| 2015/0032978 | A1 | * | 1/2015 | Bashyam | G06F 16/1752 711/162 |
| 2015/0301823 | A1 | * | 10/2015 | Hatakeyama | G06F 8/71 717/173 |

(Continued)

FOREIGN PATENT DOCUMENTS

| JP | 2001-014194 | 1/2001 |
| JP | 2009-259007 | 11/2009 |
| JP | 2011-103106 | 5/2011 |

Primary Examiner — Gims S Philippe
(74) Attorney, Agent, or Firm — Fujitsu Patent Center

(57) ABSTRACT

An information processing system includes one or more processors configured to acquire a plurality of pieces of divided data generated by dividing the data, determine, in accordance with offset information, a first position of a first key point closest to a head position of each of the plurality of pieces of divided data, and a second position of a second key point closest to an end position of each of the plurality of pieces of divided data, generate first difference information indicating first data between the head position and the first position, and second difference information indicating second data between the end position and the second position, generate metadata to be used for decoding partial data, distribute the plurality of pieces of divided data to a plurality (Continued)

of nodes respectively together with the first difference information, the second difference information, and the metadata.

13 Claims, 17 Drawing Sheets

(56) References Cited

U.S. PATENT DOCUMENTS

2016/0044368 A1* 2/2016 Ouyang ............... H04N 21/437
725/89

* cited by examiner

FIG. 10

ARRANGEMENT DATA STORAGE UNIT — 123

ARRANGEMENT DATA MANAGEMENT TABLE — 123a

| DIVIDED DATA | DELETION (HEAD) | DELETION (END) | ADDITION (HEAD) | ADDITION (END) | ADDITION (ftyp) | ADDITION (moov) |
|---|---|---|---|---|---|---|
| D11 | size1 | size2 | — | — | ftyp1 | moov1 |
| D12 | — | — | data1 | data2 | ftyp2 | moov2 |
| D13 | size3 | — | — | — | ftyp3 | moov3 |

FIG. 11

MANAGEMENT DATA STORAGE UNIT — 210

DATA MANAGEMENT TABLE — 211

| MOVING IMAGE FILE NAME | DIVIDED DATA ID | STORAGE LOCATION |
|---|---|---|
| F1 | ID1 | DataNode1 |
|  | ID2 | DataNode2 |
|  | ID3 | DataNode3 |
| ... | ... | ... |

FIG. 12

EXAMPLE OF DATA ARRANGEMENT FOR DATA NODES

DATA NODE — 300

| DIVIDED DATA | DELETION (HEAD) | DELETION (END) | ADDITION (HEAD) | ADDITION (END) | ADDITION (ftyp) | ADDITION (moov) |
|---|---|---|---|---|---|---|
| D11 | size1 | size2 | — | — | ftyp1 | moov1 |

DATA NODE — 400

| DIVIDED DATA | DELETION (HEAD) | DELETION (END) | ADDITION (HEAD) | ADDITION (END) | ADDITION (ftyp) | ADDITION (moov) |
|---|---|---|---|---|---|---|
| D12 | — | — | data1 | data2 | ftyp2 | moov2 |

DATA NODE — 500

| DIVIDED DATA | DELETION (HEAD) | DELETION (END) | ADDITION (HEAD) | ADDITION (END) | ADDITION (ftyp) | ADDITION (moov) |
|---|---|---|---|---|---|---|
| D13 | size3 | — | — | — | ftyp3 | moov3 |

INFORMATION PROCESSING SYSTEM AND INFORMATION PROCESSING METHOD

CROSS-REFERENCE TO RELATED APPLICATION

This application is based upon and claims the benefit of priority of the prior Japanese Patent Application No. 2018-218053, filed on Nov. 21, 2018, the entire contents of which are incorporated herein by reference.

FIELD

The embodiments discussed herein are related to an information processing technology.

BACKGROUND

An information processing system for performing processing such as analysis for large scale data is used. As the large scale data to be processed, for example, data including a moving image, a sound, and the like may be cited. For example, the information processing system may analyze moving image data and recognize a shape and movement of an object to be drawn when the moving image data is reproduced.

In the information processing system, data may be distributed and stored in a plurality of nodes. For example, there is a proposal for a distributed storage system in which data that is divisible in a semantically divisible manner is read out from storage and divided, and each piece of divided data is stored in a separate node.

There is also a proposal for a job management computer that causes a grid computer to execute a job for processing a file by arranging each of a plurality of files including a plurality of pieces of data in a plurality of grid computers.

There is also a proposal for a file management apparatus which may suppress an increase in disk area and restore a file that is an old version file by extracting only a different portion between a current file and a new file as a difference file and storing the difference file as a backup file.

For example, related technologies are disclosed in Japanese Laid-open Patent Publication Nos. 2009-259007, 2011-103106, and 2001-14194.

SUMMARY

According to an aspect of the embodiments, an information processing system includes one or more processors configured to acquire a plurality of pieces of divided data generated by dividing the data, determine, in accordance with offset information, a first position of a first key point closest to a head position of each of the plurality of pieces of divided data, and a second position of a second key point closest to an end position of each of the plurality of pieces of divided data, generate first difference information indicating first data between the head position and the first position, and second difference information indicating second data between the end position and the second position, generate metadata to be used for decoding partial data, distribute the plurality of pieces of divided data to a plurality of nodes respectively together with the first difference information, the second difference information, and the metadata.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a table illustrating an example of an arrangement data management table;

FIG. 11 is a table illustrating an example of a data management table;

FIG. 12 is a diagram illustrating an example of data arrangement for data nodes;

DESCRIPTION OF EMBODIMENTS

It is conceivable that data is divided and arranged into a plurality of nodes, and each of the plurality of nodes are enabled to execute predetermined processing such as analysis to each part of the data in a distributed manner. However, the data may include metadata for decoding at a predetermined position such as a head and an end, and may not be decoded in a partial unit by simply dividing the data.

Therefore, it is conceivable that the data is previously edited in a plurality of pieces of sub-data (the data is divided at several time intervals and the metadata for decoding is added to the divided data) having a form that may be independently decoded, and the plurality of pieces of sub-data are arranged in the plurality of nodes. However, in this case, when the original data is to be obtained, editing processing such as removing the metadata for decoding from the respective pieces of sub-data is performed, respective pieces of edited data after the editing processing are combined, and the original data is restored. Therefore, it takes a long time to obtain the original data.

On the other hand, it is conceivable that the pieces of divided data obtained by simply dividing the original data together with the plurality of pieces of sub-data may be arranged in the plurality of nodes. In this case, in order to obtain the original data, it may only be required to combine the pieces of divided data, and it is not required to execute editing processing such as removing the metadata for decoding, so that it may be possible to reduce time required for acquiring the original data. However, in this method, each node holds both the sub-data and the divided data, so that utilization efficiency of storage capacity of each node is reduced.

Figure 1:
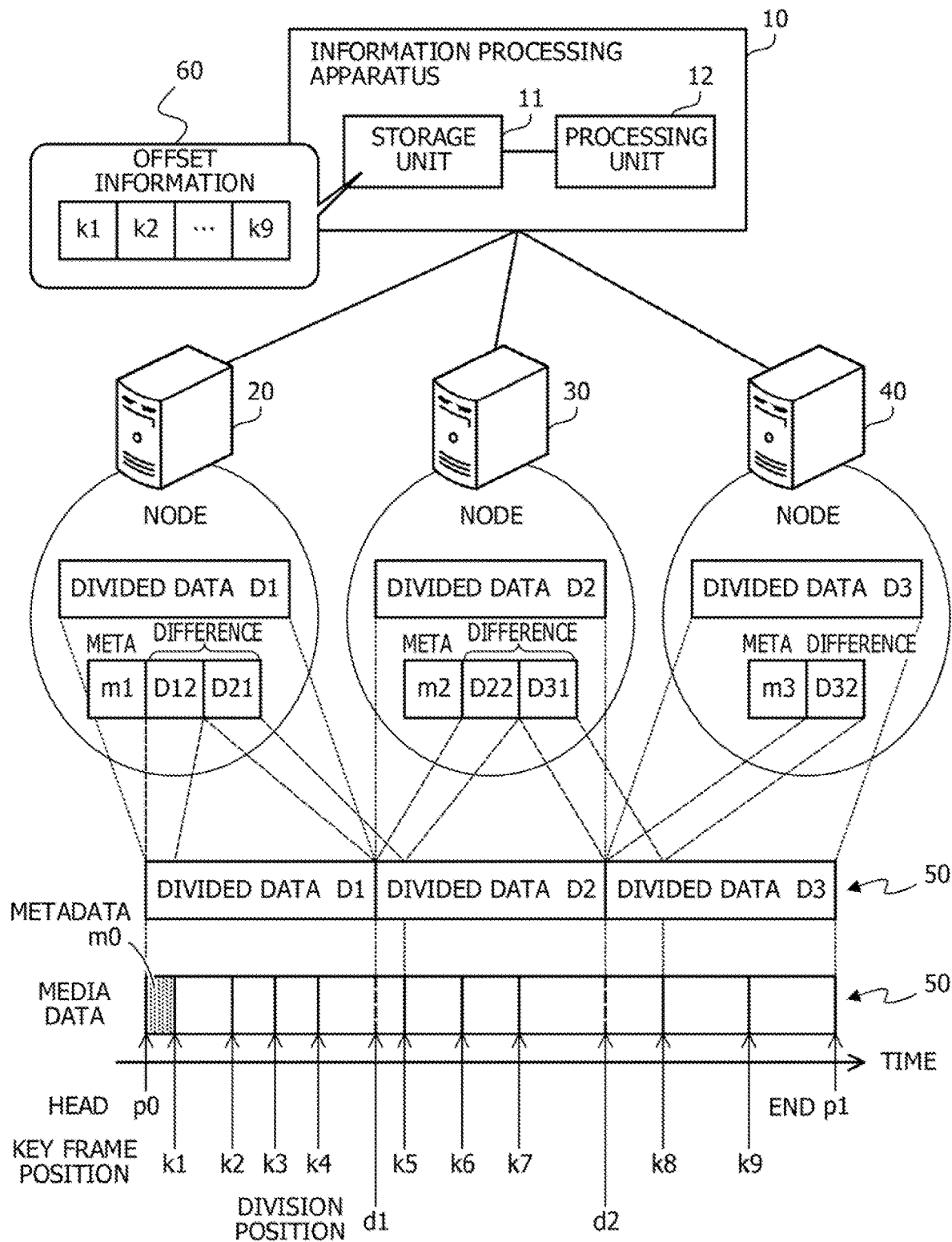
FIG. 1 is a diagram illustrating an information processing apparatus according to a first embodiment.

FIG. 1 is a diagram illustrating an information processing apparatus according to the first embodiment. An information processing apparatus 10 is coupled to nodes 20, 30, and 40. The information processing apparatus 10 and the nodes 20, 30, and 40 may be coupled to a network (not illustrated). The nodes 20, 30, and 40 are used to store and analyze data 50. The information processing apparatus is an example of an information processing system.

The data 50 is, for example, moving image data, and includes a plurality of frames encoded in time series. The data 50 may include sound data. In the data 50, the data is compressed by inter-frame prediction. Examples of encoding formats include H.264 (H.264/MPEG-4 AVC), H.265 (H.265/MPEG-H HEVC), and the like. The frames included in the data 50 have the following types.

The first is a key frame. The key frame may also be referred to as an I-frame. The key frame is a frame that is a reference for inter-frame prediction, and is a frame that may be decoded by itself (a frame that may be decoded without referring to other frames). The second is a P-frame. The P-frame is a frame that is a difference from a previous frame of the frame itself. The third is a B-frame. The B-frame is a frame that is a difference from previous and following frames of the frame itself.

Metadata m0 is added to a predetermined position (for example, a head or an end) of the data 50. The metadata m0 is data to be used for decoding the data 50, and includes information such as a data format, a frame offset, and a frame rate. In the following example, the metadata m0 is added to the head of the data 50. However, the metadata m0 may be added to the end of the data 50. In the figure, metadata is sometimes abbreviated to "meta".

For example, the nodes 20, 30, and 40 analyze the data 50 and recognize a shape and movement of an object to be drawn by the data 50 when a moving image is reproduced. Thereby, for example, it becomes possible to detect an abnormality, a suspicious person, or the like in a monitoring area.

The information processing apparatus 10 divides the data 50 into a plurality of divided data, and stores the plurality of divided data in the nodes 20, 30, and 40. When acquiring the data 50, the information processing apparatus 10 acquires the plurality of divided data stored in the nodes 20, 30, and 40, and combines the plurality of divided data to restore the data 50. Furthermore, the information processing apparatus 10 provides a function of causing each of the nodes 20, 30, and 40 to execute analysis of a partial unit of the data 50 in a distributed manner.

The information processing apparatus 10 includes a storage unit 11 and a processing unit 12. The storage unit 11 may be a volatile storage device such as a random-access memory (RAM) or may be a nonvolatile storage device such as a hard disk drive (HDD) or a flash memory. The processing unit 12 may include a central processing unit (CPU), a digital signal processor (DSP), an application specific integrated circuit (ASIC), a field-programmable gate array (FPGA), or the like. The processing unit 12 may be a processor for executing a program. The "processor" referred to herein may include a set of a plurality of processors (a multiprocessor).

The storage unit 11 includes offset information 60. The offset information 60 is information indicating a position of the key frame included in the data 50 (an offset from a head position p0 of the data 50 (for example, expressed in units of bytes)). For example, the offset information 60 is generated by the processing unit 12 based on the metadata m0, and is stored in the storage unit 11. As an example, the offset information 60 includes positions k1, k2, . . . , k9 of the key frames.

When acquiring the data 50 to be stored in the nodes 20, 30, and 40, the processing unit 12 stores the data 50 in the storage unit 11, and divides the data 50 as follows. The processing unit 12 divides the data 50 into a predetermined size unit, and acquires a plurality of pieces of divided data. For example, since the nodes 20, 30, and 40 as storage destinations are three, the processing unit 12 divides the data 50 into three pieces of divided data D1, D2, and D3 for each predetermined size. Division positions are denoted by d1 and d2. Sizes of the pieces of divided data D1, D2, and D3 may be the same. Alternatively, the sizes of the pieces of divided data D1 and D2 may be the same, and the size of the last divided data D3 may be smaller than the sizes of the pieces of divided data D1 and D2.

At this time, a head position of the divided data D1 is p0, and an end position is (d1−1). (d1−1) indicates a position immediately before the position d1. A head position of the divided data D2 is (the division position) d1, and an end position is (d2−1). (d2−1) indicates a position immediately before the position d2. A head position of the divided data D3 is (the division position) d2, and an end position is p1.

Based on the offset information 60 stored in the storage unit 11, the processing unit 12 specifies a first position of the key frame closest to the head position of the divided data and a second position of the key frame closest to the end position of the divided data, for each piece of divided data.

For example, with respect to the divided data D1, the processing unit 12 specifies the position k1 of the key frame closest to the head position p0 of the divided data D1 and the position k5 of the key frame closest to the end position (d1−1) of the divided data D1.

With respect to the divided data D2, the processing unit 12 specifies the position k5 of the key frame closest to the head position d1 of the divided data D2, and the position k8 of the key frame closest to the end position (d2−1) of the divided data D2.

With respect to the divided data D3, the processing unit 12 specifies the position k8 of the key frame closest to the head position d2 of the divided data D3. Since the end position p1 of the divided data D3 coincides with the end position p1 of the data 50, the processing unit 12 does not have to specify the position of the key frame closest to the end position p1 with respect to the divided data D3.

The processing unit 12 generates first difference information indicating data between the head position and the first position of the divided data and second difference information indicating data between the end position and the second position of the divided data, for each piece of divided data. In the figure, the difference information may be abbreviated as a "difference".

When the head position of the divided data in the data 50 is earlier than the first position, the first difference information is a size of data to be deleted corresponding to data from the head position to the position immediately before the first position. When the head position is later than the first position, the first difference information is data to be added corresponding to data from the first position to the position immediately before the head position in the data 50. When the head position of the divided data coincides with the first position, the first difference information indicates no difference data with respect to the head position of the divided data.

When the end position of the divided data in the data 50 is earlier than the second position, the second difference information is data to be added corresponding to data from the position immediately after the end position to the position immediately before the second position of the data 50. When the end position is later than the second position, the second difference information is a size of data to be deleted corresponding to data from the second position to the end position. When the end position of the divided data coincides with the second position, the second difference information indicates a size of the last frame of the divided data (the size of the data to be deleted). When the end position of the divided data corresponds to the end of the data 50, the second difference information indicates no difference data with respect to the end position of the divided data.

For example, with respect to the divided data D1, the processing unit 12 generates difference information Δ12 indicating data between the head position p0 and the key frame position k1, and difference information Δ21 indicating data between the end position (d1−1) and the key frame position k5. Here, p0≤k1 is satisfied. In this case, the difference information Δ12 corresponds to data to be removed from the divided data D1, and indicates a size of data (not including data at the key frame position k1) between the head position p0 and the key frame position k1, for example. Further, (d1−1)<k5 is satisfied. In this case, the difference information Δ21 corresponds to data to be added to the divided data D1, and is for example, data between the end position (d1−1) and the key frame position k5 (not including data at the end position (d1−1) and data at the key frame position k5).

With respect to the divided data D2, the processing unit 12 generates difference information Δ22 indicating data between the head position d1 and the key frame position k5, and difference information Δ31 indicating data between the end position (d2−1) and the key frame position k8. d1≤k5 is satisfied. In this case, the difference information Δ22 corresponds to data to be removed from the divided data D2, and indicates a size of data (not including data at the key frame position k5) between the head position d1 and the key frame position k5, for example. Further, (d2−1)<k8 is satisfied. In this case, the difference information Δ31 corresponds to data to be added to the divided data D2, and is, for example, data between the end position (d2−1) and the key frame position k8 (not including data at the end position (d2−1) and data at the key frame position k8).

With respect to the divided data D3, the processing unit 12 generates the difference information Δ32 indicating data between the head position d2 and the key frame position k8. Here, d2≤k8 is satisfied. In this case, the difference information Δ32 corresponds to data to be removed from the divided data D3, and indicates a size of data (not including data at the key frame position k8) between the head position d2 and the key frame position k8, for example.

In the above example, a case has been mainly described in which, with respect to certain divided data, (a head position)≤(a key frame position closest to the head position) is satisfied. On the other hand, there may be a case in which (the head position)>(the key frame position closest to the head position) is satisfied. In this case, the first difference information corresponds to data to be added to the divided data, and is data (not including data at the head position) between (the key frame position closest to the head position) and (the head position).

In the above example, a case where certain divided data is set to be (an end position)<(a key frame position closest to the end position) has been mainly explained. On the other hand, (the end position)≥(the key frame position closest to the end position) may be satisfied. In this case, the second difference information corresponds to data to be removed from the divided data, and indicates a size of data between (the key frame position closest to the end position) and (the end position).

The processing unit 12 generates metadata to be used for decoding partial data obtained by applying the first difference information and the second difference information to the divided data, for each piece of divided data. For example, with respect to the divided data D1, the processing unit 12 generates metadata m1 to be used for decoding partial data obtained by applying the difference information Δ12 and Δ21 to the divided data D1. With respect to the divided data D2, the processing unit 12 generates metadata m2 to be used for decoding partial data obtained by applying the difference information Δ22 and Δ31 to the divided data D2. With respect to the divided data D3, the processing unit 12 generates metadata m3 to be used for decoding partial data obtained by applying the difference information Δ32 to the divided data D3. Sizes of the pieces of metadata m1, m2, and m3 are much smaller than those of the divided data.

The processing unit 12 arranges a plurality of pieces of divided data in a plurality of nodes. The processing unit 12 arranges the first difference information, the second difference information, and the metadata corresponding to the divided data in the same node as the divided data.

For example, the processing unit 12 arranges the divided data D1 in the node 20, the divided data D2 in the node 30, and the divided data D3 in the node 40. The processing unit 12 arranges the difference information Δ12 and Δ21, and the metadata m1 corresponding to the divided data D1 in the node 20. The processing unit 12 arranges the difference information Δ22 and Δ31, and the metadata m2 corresponding to the divided data D2 in the node 30. The processing unit 12 arranges the difference information Δ32 and the metadata m3 corresponding to the divided data D3 in the node 40.

According to the information processing apparatus 10, a plurality of divided data obtained by dividing data into a predetermined size unit is acquired. Based on offset information, a first position of a key frame closest to a head position of the divided data and a second position of a key frame closest to an end position of the divided data are specified for each piece of the divided data. First difference information indicating data between the head position and the first position and second difference information indicating data between the end position and the second position are generated for each piece of the divided data. Metadata to be used for decoding partial data obtained by applying the first difference information and the second difference information to the divided data is generated for each piece of the divided data. The plurality of divided data are arranged in a plurality of nodes. The first difference information, the second difference information, and the metadata corresponding to the divided data are arranged in the same node as the divided data.

This makes it possible to suppress degradation in utilization efficiency of storage capacity and to perform distributed processing of the data. Specifically, for example, the distributed processing is performed as follows. The nodes 20, 30, and 40 may also be used for storing the data 50. Therefore, when a user requires to obtain the data 50, it is preferable that the data 50 may be obtained at high speed. In this regard, the information processing apparatus 10 stores the pieces of divided data D1, D2, and D3 obtained by simply dividing the data 50 in units of predetermined size, in the nodes 20, 30, and 40, respectively. Therefore, the information processing apparatus 10 may acquire the pieces of divided data D1, D2, and D3 stored in the nodes 20, 30, 40 and combine them in the same order as the division order, so that the data 50 may be acquired at high speed because the data 50 is not required to perform other editing processing.

The nodes 20, 30, and 40 may generate partial data by applying difference information and metadata that are arranged in the nodes 20, 30, and 40, to the divided data. For this reason, when the data 50 is analyzed, each of the nodes 20, 30, and 40 may perform processing such as analysis to the generated partial data in a distributed manner. A method of applying the difference information to the divided data held by each of the nodes 20, 30, and 40 is instructed by the information processing apparatus 10. For example, the information processing apparatus 10 may transmit a program for causing the analysis processing to be executed. In this case, each of the nodes 20, 30, and 40 executes the program to analyze the partial data held by each node itself.

In this manner, each of the plurality of nodes generates decodable partial data based on the divided data, the first difference information, the second difference information, and the metadata arranged in each node itself, and analyzes the partial data. For example, although it may be considered that the respective pieces of divided data are collected and combined at any one of the nodes and the node analyzes the whole of the data 50, the processing takes long time in this method. On the other hand, the information processing apparatus 10 allows the processing such as the analysis of the data 50 to be distributed to and executed by the nodes 20, 30, and 40, so that processing speed may be increased. For example, by performing distributed processing for the data 50 at the three nodes 20, 30, and 40, it is possible to shorten the processing time to approximately ⅓ of the processing time at one node.

A method of executing processing by each node holding data is sometimes referred to as neighborhood processing. By performing the neighborhood processing, the processing is distributed to and executed by each node holding data to be processed, whereby communication for analysis between the nodes or between each node and the information processing apparatus 10 may be reduced, and the processing may be further speeded up.

In particular, for example, it is only required to arrange the difference information to be used to generate the partial data from the divided data and the metadata for restoration of the partial data in the nodes 20, 30, and 40, and it is not required to arrange all the partial data. That is, for example, the divided data, only the difference information of the partial data, and the metadata for decoding the partial data may be arranged in the nodes 20, 30, and 40. Accordingly, storage capacity to be used in each node may be reduced than that in a case where both of the divided data and the partial data are arranged in each node. Thus, it is possible to suppress degradation in utilization efficiency of storage capacity of each node and to perform the distributed processing for the data.

Second Embodiment

Next, a second embodiment will be described.

Figure 2:
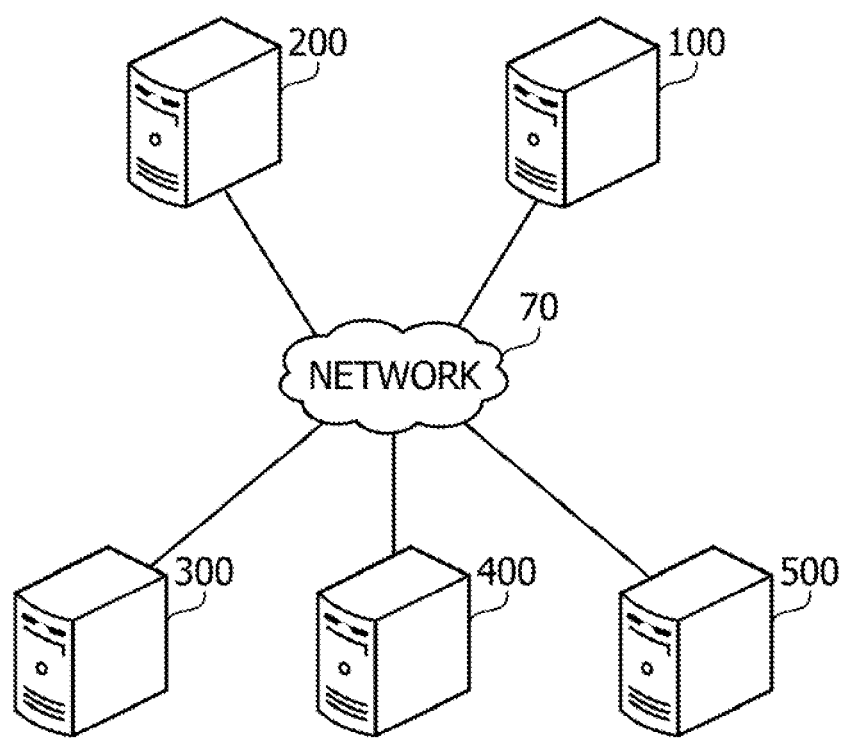
FIG. 2 is a diagram illustrating an example of an information processing system according to a second embodiment.

FIG. 2 is a diagram illustrating an example of an information processing system according to the second embodiment.

The information processing system according to the second embodiment includes a client 100, a data management node 200, and data nodes 300, 400, and 500. The client 100, the data management node 200 and the data nodes 300, 400, and 500 are coupled to a network 70. The network 70 is, for example, a local area network (LAN).

The client 100 is a client computer for dividing data and storing the divided data in the data nodes 300, 400, and 500. However, a function of the client 100 may be enabled by a server computer (front-end server) that receives a request from a client terminal (not illustrated) and provides a service for dividing the data and storing the divided data in the data nodes 300, 400, and 500. The client 100 is an example of the information processing apparatus 10 according to the first embodiment.

The data management node 200 is a server computer for managing information associating a name of data with a data node of storage destination of divided data obtained by dividing the data. For example, the data management node 200 receives an inquiry including the name (for example, a file name) of the data, from the client 100. Then, the data management node 200 provides the client 100 with a path (including information indicating the data node) to the storage destination of the divided data corresponding to the name of the data.

The data nodes 300, 400, and 500 hold the pieces of divided data obtained by dividing the data in a distributed manner. Each of the data nodes 300, 400, and 500 is an example of each of the nodes 20, 30, and 40 according to the first embodiment. The number of the data nodes 300, 400, and 500 is not limited to three, and may be two or four or more.

For example, Hadoop (registered trademark) may be cited as an example of a framework of distributed processing in the information processing system according to the second embodiment. In Hadoop, a distributed file system called Hadoop Distributed File System (HDFS) is prepared, and processing is performed in a node where data is stored, whereby data transfer time to a specific processing node is reduced and processing speed is increased.

Figure 3:
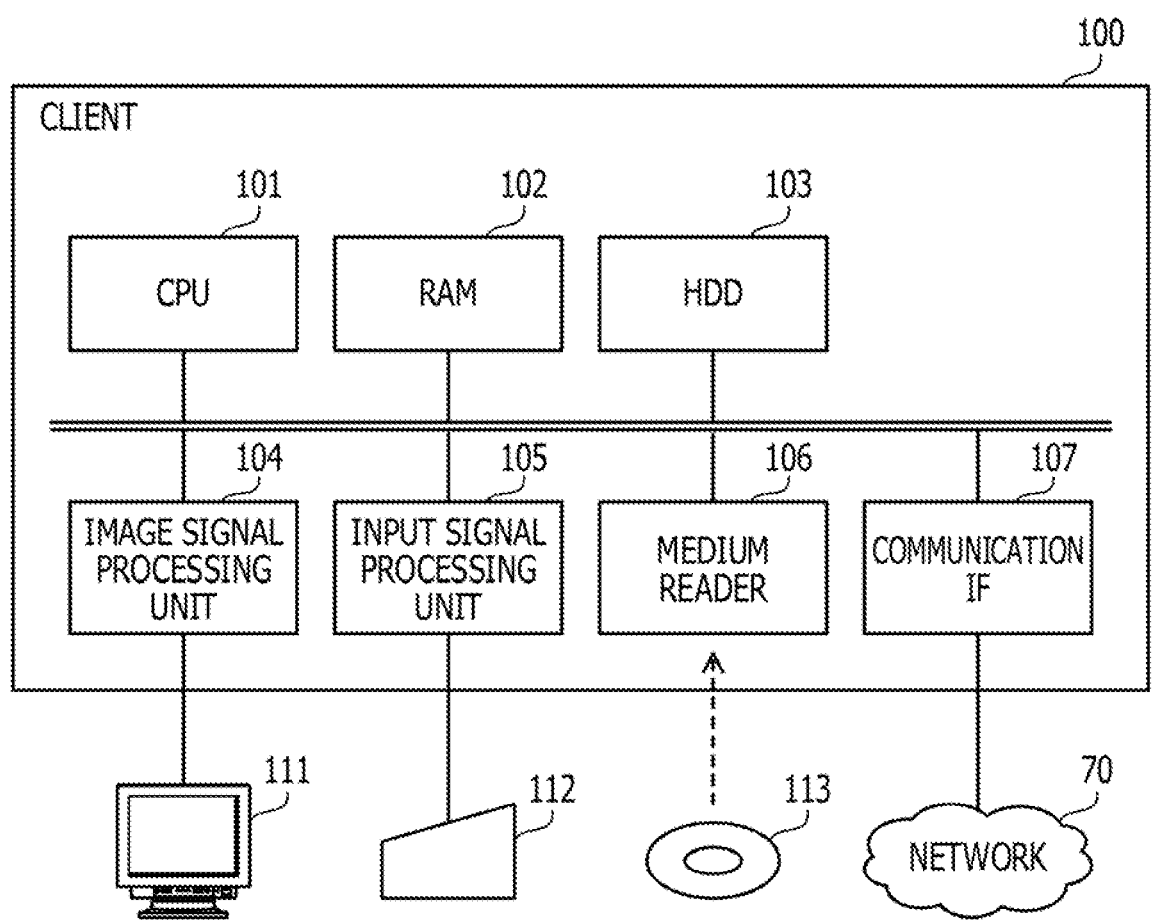
FIG. 3 is a block diagram illustrating an example of hardware of a client.

FIG. 3 is a block diagram illustrating an example of hardware of a client.

The client 100 includes a CPU 101, a RAM 102, an HDD 103, an image signal processing unit 104, an input signal processing unit 105, a medium reader 106, and a communication interface (IF) 107. The CPU 101 corresponds to the processing unit 12 of the first embodiment. The RAM 102 or the HDD 103 corresponds to the storage unit 11 of the first embodiment.

The CPU 101 is a processor that executes program instructions. The CPU 101 loads at least part of a program and data stored in the HDD 103 into the RAM 102 and executes the program. The CPU 101 may include a plurality of processor cores. The client 100 may also include a plurality of processors. Processing to be described below may be performed in parallel using a plurality of processors or processor cores. A set of a plurality of processors may be referred to as a "multiprocessor" or simply a "processor".

The RAM 102 is a volatile semiconductor memory that temporarily stores a program to be executed by the CPU 101 and data to be used for computation by the CPU 101. The client 100 may include a memory of a type other than RAMs, and may include a plurality of memories.

The HDD 103 is a nonvolatile storage device for storing software programs such as an operating system (OS), middleware, and application software, and data. The client 100 may include a storage device of another type such as a flash memory or a solid state drive (SSD) or may include a plurality of nonvolatile storage devices.

The image signal processing unit 104 outputs an image to a display 111 coupled to the client 100 in accordance with an instruction from the CPU 101. As the display 111, any type of display such as a cathode ray tube (CRT) display, a liquid crystal display (LCD), a plasma display, or an organic electro-luminescence (OEL) display may be used.

The input signal processing unit 105 acquires an input signal from an input device 112 coupled to the client 100, and outputs the input signal to the CPU 101. As the input device 112, a pointing device such as a mouse, a touch panel, a touchpad, or a trackball, a keyboard, a remote controller, a button switch, or the like may be used. A plurality of types of input devices may be coupled to the client 100.

The medium reader 106 is a reading device that reads programs and data recorded in a recording medium 113. As the recording medium 113, for example, a magnetic disk, an optical disk, a magneto-optical disk (MO), a semiconductor memory, or the like may be used. The magnetic disk includes a flexible disk (FD) and a hard disk drive (HDD). The optical disc includes a compact disc (CD) and a digital versatile disc (DVD).

The medium reader 106 copies a program and data read from the recording medium 113 to another recording medium such as the RAM 102 or the HDD 103. The read program is executed by, for example, the CPU 101. The recording medium 113 may be a portable recording medium, or may be used to distribute programs and data. The recording medium 113 and the HDD 103 may be referred to as a computer-readable recording medium.

The communication IF 107 is an interface which is coupled to the network 70 and which communicates with other computers via the network 70. The communication IF 107 is coupled to a communication device such as a switch or a router with a cable.

The data management node 200 and the data nodes 300, 400, and 500 are also built by hardware similar to that of the client 100.

Figure 4:
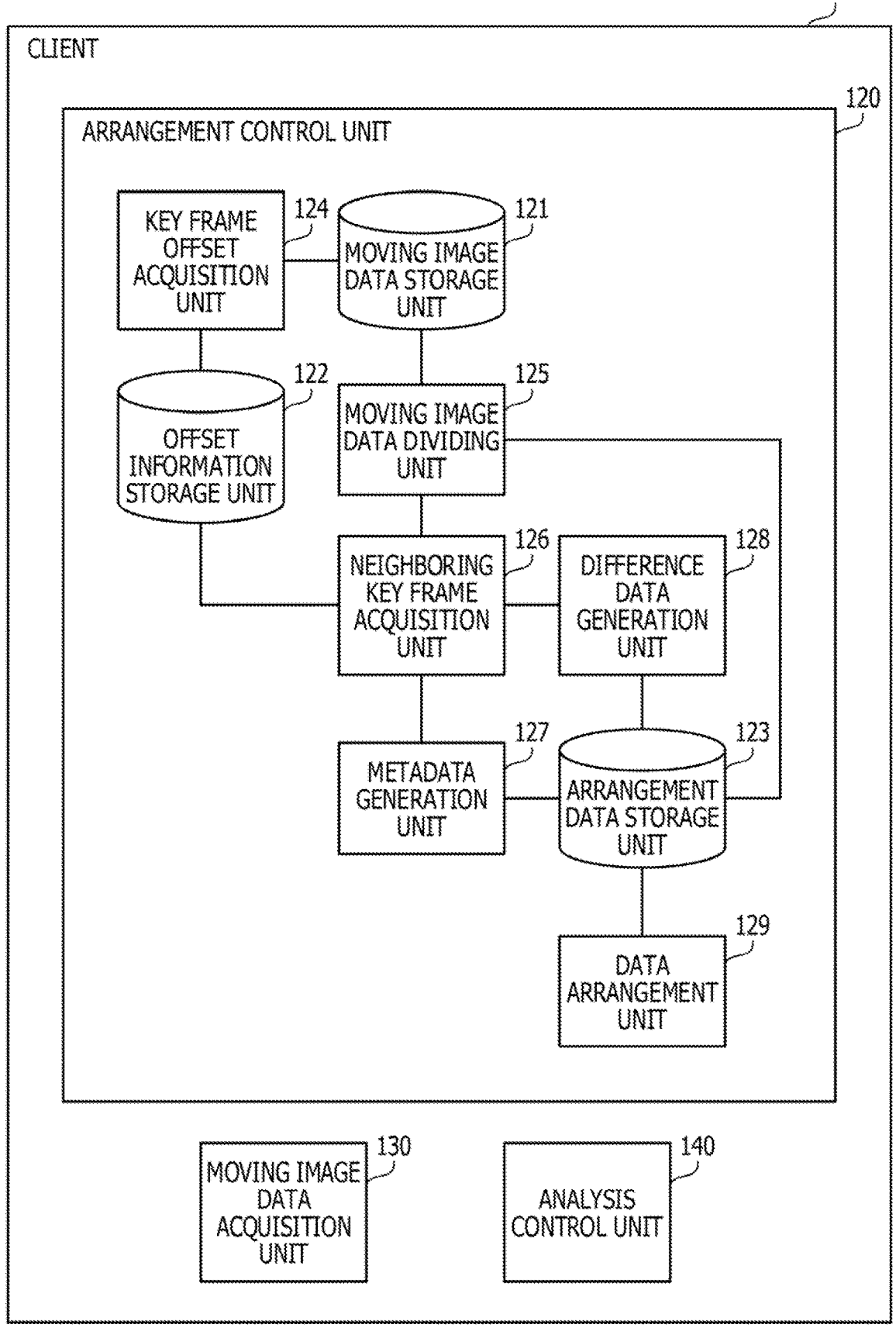
FIG. 4 is a diagram illustrating an example of a function of a client.

FIG. 4 is a diagram illustrating an example of functions of a client. The client 100 includes an arrangement control unit 120, a moving image data acquisition unit 130, and an analysis control unit 140. Functions of the arrangement control unit 120, the moving image data acquisition unit 130, and the analysis control unit 140 are provided by the CPU 101 executing a program stored in the RAM 102.

The arrangement control unit 120 divides data and arranges the data in the data nodes 300, 400, and 500 in a distributed manner. Hereinafter, moving image data will be exemplified as the data and described. The arrangement control unit 120 includes a moving image data storage unit 121, an offset information storage unit 122, an arrangement data storage unit 123, a key frame offset acquisition unit 124, a moving image data dividing unit 125, a neighboring key frame acquisition unit 126, a metadata generation unit 127, a difference data generation unit 128, and a data arrangement unit 129. The moving image data storage unit 121, the offset information storage unit 122, and the arrangement data storage unit 123 are implemented by a storage area secured in the RAM 102 or the HDD 103.

The moving image data storage unit 121 stores moving image data to be arranged in the data nodes 300, 400, and 500. The offset information storage unit 122 stores offset information. The offset information indicates an offset from a head of a key frame included in the moving image data. In the following description, the "offset" indicates an offset from the head of the moving image data.

The moving image data dividing unit 125 divides the moving image data stored in the moving image data storage unit 121 into a predetermined size unit (for example, 128 mega bytes (MB)) to generate divided data, and stores the divided data in the arrangement data storage unit 123.

The neighboring key frame acquisition unit 126 acquires a head position of a neighboring key frame. The neighboring key frame is the key frame closest to a head offset of divided data or the key frame closest to an end offset of the divided data.

The metadata generation unit 127 generates metadata to be used for decoding of partial moving image data. The partial moving image data is a part of moving image data generated by applying difference data to the divided data. The difference data is generated by the difference data generation unit 128. The metadata generation unit 127 stores the generated metadata in the arrangement data storage unit 123 in association with the corresponding divided data.

The difference data generation unit 128 generates difference data which is a difference between the divided data and the decodable partial moving image data. The difference data may be data itself (binary data) to be added to the head or the end of the divided data. The difference data may indicate a size of data to be deleted from the head or the end of the divided data. The difference data generation unit 128 stores the generated difference data in the arrangement data storage unit 123 in association with the corresponding divided data.

The data arrangement unit 129 arranges the arrangement data stored in the arrangement data storage unit 123 in the data nodes 300, 400, and 500. The data arrangement unit 129 transmits one piece of divided data, and difference data and metadata corresponding to the piece of divided data, to the same data node, and causes the data node to hold them. The data arrangement unit 129 transmits a file name of the moving image data and information indicating the data node that is an arrangement destination of the divided data corresponding to the moving image data, to the data management node 200. When distributing and arranging the respective pieces of divided data into the plurality of data nodes, the data arrangement unit 129 deletes the moving image data stored in the moving image data storage unit 121.

When a file name of the moving image data to be acquired is input by a user, the moving image data acquisition unit 130 acquires the moving image data corresponding to the file name. Specifically, for example, the moving image data acquisition unit 130 identifies a storage destination of each piece of divided data by inquiring the corresponding file name of the data management node 200. The moving image data acquisition unit 130 acquires each piece of divided data from the data nodes 300, 400, and 500, and combines the pieces of divided data to acquire the moving image data. The moving image data acquired by the moving image data acquisition unit 130 may be reproduced by, for example, predetermined software for reproducing a moving image.

When the file name of the moving image data to be analyzed is input by the user, the analysis control unit 140 causes the data nodes 300, 400, and 500 to analyze the pieces of divided data corresponding to the file name. Specifically, for example, the analysis control unit 140 specifies the storage destination of each piece of divided data by inquiring the corresponding file name of the data management node 200. The analysis control unit 140 transmits a program for causing the data nodes 300, 400, and 500 to execute the analysis. The analysis control unit 140 causes the program to be executed, thereby causing each of the data nodes 300, 400, and 500 to generate partial moving image data, and to execute the analysis of the partial moving image data in the distributed manner. The analysis control unit 140 acquires analysis results from the data nodes 300, 400, and 500, integrates the analysis results, and provides the integrated analysis results to the user.

Figure 5:
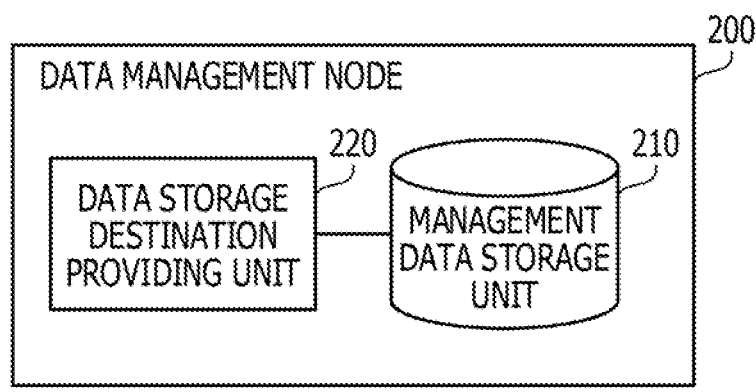
FIG. 5 is a diagram illustrating an example of a function of a data management node.

FIG. 5 is a diagram illustrating an example of functions of a data management node. The data management node 200 includes a management data storage unit 210 and a data storage destination providing unit 220. The management data storage unit 210 is provided by using a storage area such as a RAM or an HDD included in the data management node 200. The data storage destination providing unit 220 is provided by executing a program stored in the RAM included in the data management node 200 by a CPU included in the data management node 200.

The management data storage unit 210 stores a data management table. The data management table is data for managing the file name of the moving image data and a path to an arrangement destination of each piece of divided data obtained by dividing the moving image data.

The data storage destination providing unit 220 registers the file name of the moving image data and the path to the arrangement destination of each piece of divided data in the data management table stored in the management data storage unit 210. When receiving the file name of the moving image data from the client 100, the data storage destination providing unit 220 provides the client 100 with the path to the arrangement destination of each piece of divided data corresponding to the file name.

Figure 6:
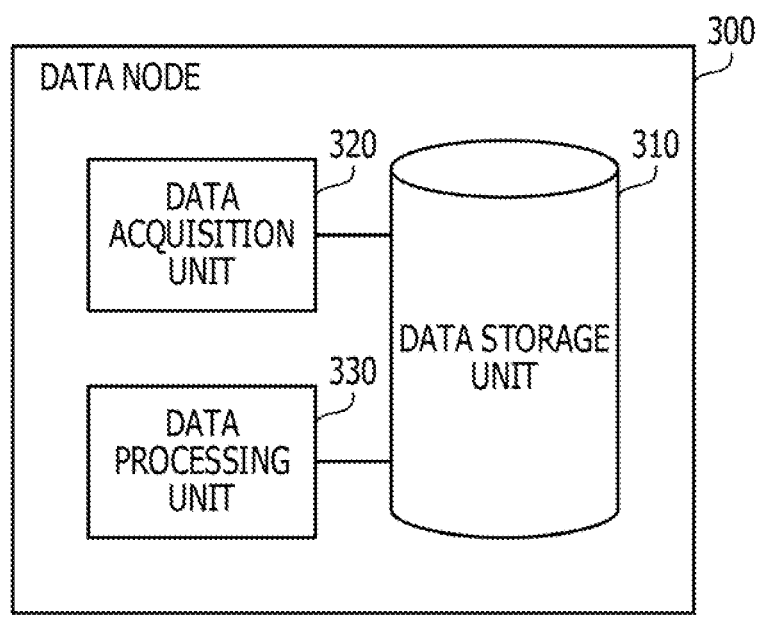
FIG. 6 is a diagram illustrating an example of a function of a data node.

FIG. 6 is a diagram illustrating an example of functions of a data node. The data node 300 includes a data storage unit 310, a data acquisition unit 320, and a data processing unit 330. The data storage unit 310 is implemented by an auxiliary storage device such as an HDD included in the data node 300. The data acquisition unit 320 and the data processing unit 330 are provided by executing a program stored in a RAM included in the data node 300 by a CPU included in the data node 300. The data nodes 400 and 500 also have functions similar to that of the data node 300.

The data storage unit 310 stores divided data, and difference data and metadata corresponding to the divided data. The data acquisition unit 320 acquires the divided data, and the difference data and the metadata corresponding to the divided data from the client 100, and stores them in the data storage unit 310. The data acquisition unit 320 reads out the divided data designated by the client 100 from the data storage unit 310, and transmits the divided data to the client 100.

The data processing unit 330 executes processing corresponding to a program transmitted from the client 100. Specifically, the data processing unit 330 applies the difference data to the divided data, adds the metadata to generate partial moving image data, and decodes the partial moving image data to recognize a shape or movement of an object contained in the moving image to be drawn by the partial moving image data. For example, the data processing unit 330 identifies the object by the recognition, and transmits information indicating the specified object to the client 100.

Figure 7:
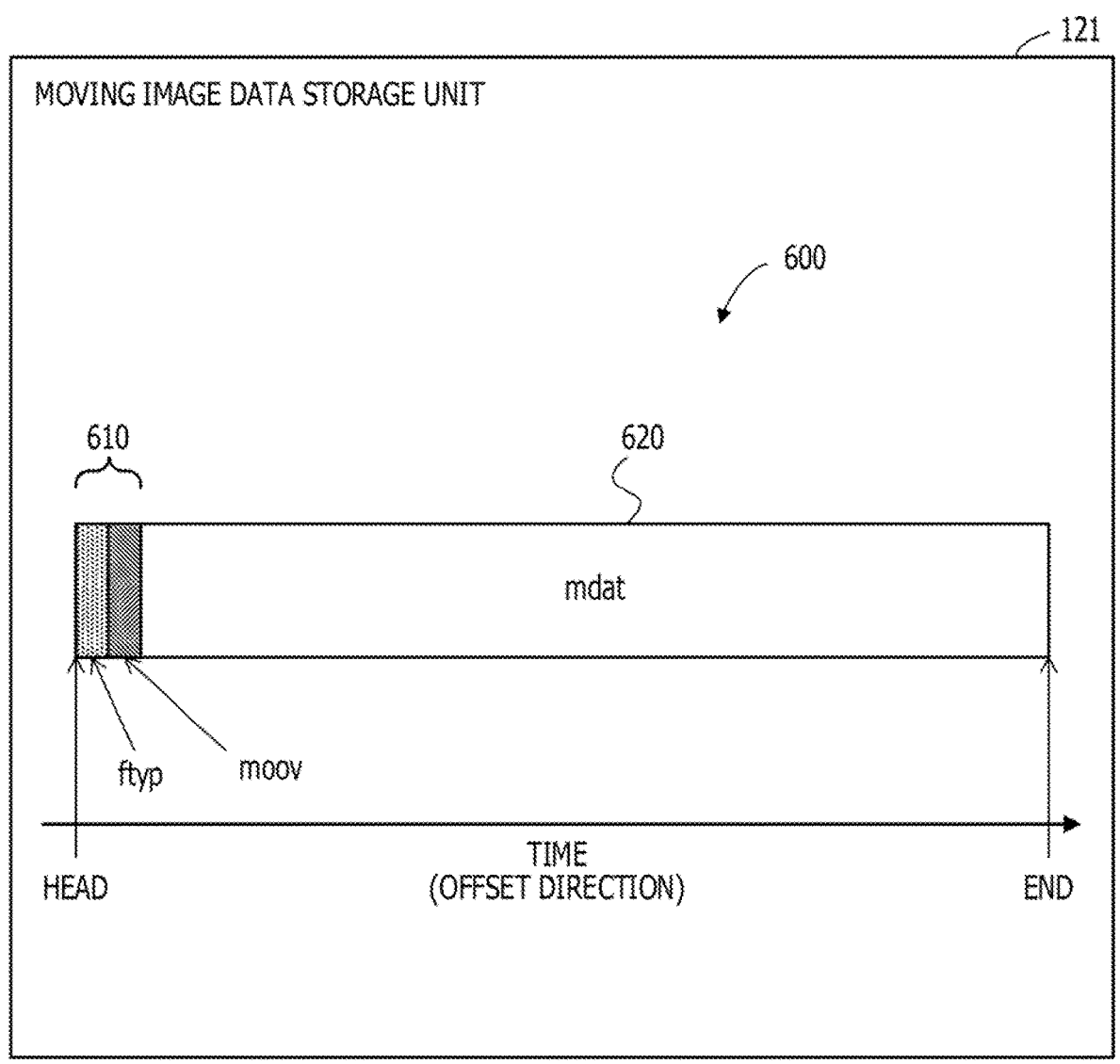
FIG. 7 is a diagram illustrating an example of moving image data.

FIG. 7 is a diagram illustrating an example of moving image data. Moving image data 600 is stored in the moving image data storage unit 121. As an example, it is assumed that the moving image data is stored in an MP4 container in the H.264 encoding format. However, the format of the moving image data is not limited to the above format, and may be another format (for example, H.265) in which a configuration similar to that of the moving image data to be described below is used.

The moving image data 600 includes metadata segments 610 and a media segment 620. The metadata segment 610 is a segment including metadata for decoding. The metadata segment 610 is located at a head of the moving image data 600. However, the metadata segment 610 may be an end of the moving image data 600. The metadata segment 610 includes ftyp and moov. ftyp is data indicating a file format. moov is data indicating an offset of each frame from the head position of the moving image data 600, a frame rate, or the like.

The media segment 620 is a segment including data (mdat) of a plurality of frames encoded in time series. In FIG. 7, a direction from a left side to a right side of the drawing is a positive direction of time. The plurality of frames includes an I-frame (key frame), a P-frame, and a B-frame.

Figure 8:
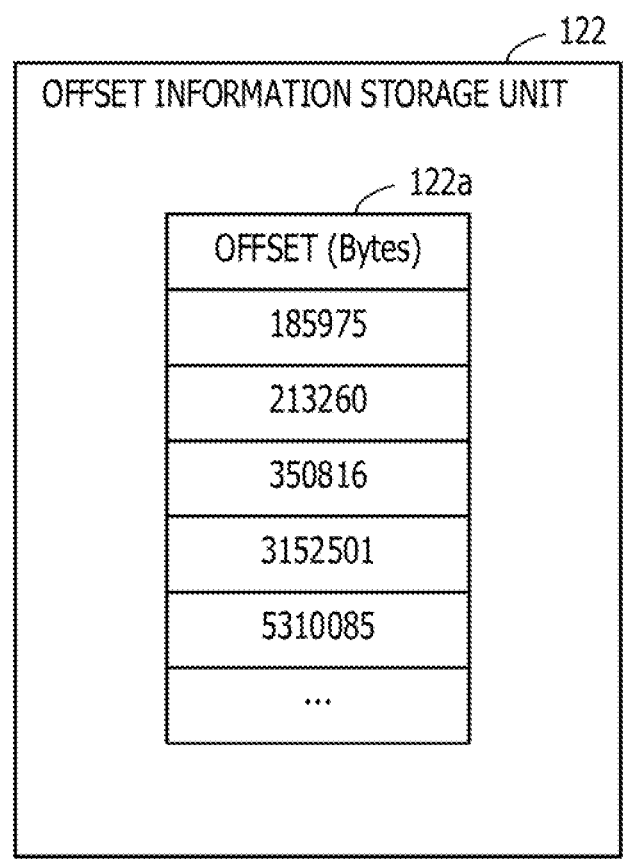
FIG. 8 is a diagram illustrating an example of offset information.

FIG. 8 is a diagram illustrating an example of offset information. The offset information 122a is stored in the offset information storage unit 122, The offset information 122a indicates an offset of a key frame with respect to the head position of the moving image data 600. A unit of the offset is, for example, byte. The offset information 122a is generated by the key frame offset acquisition unit 124, based on the metadata segment 610 included in the moving image data 600, and is stored in the offset information storage unit 122.

For example, the offset information 122a includes information such as 185975 (bytes), 213260 (bytes), 350816 (bytes), and the like as the offset of the key frame.

Figure 9:
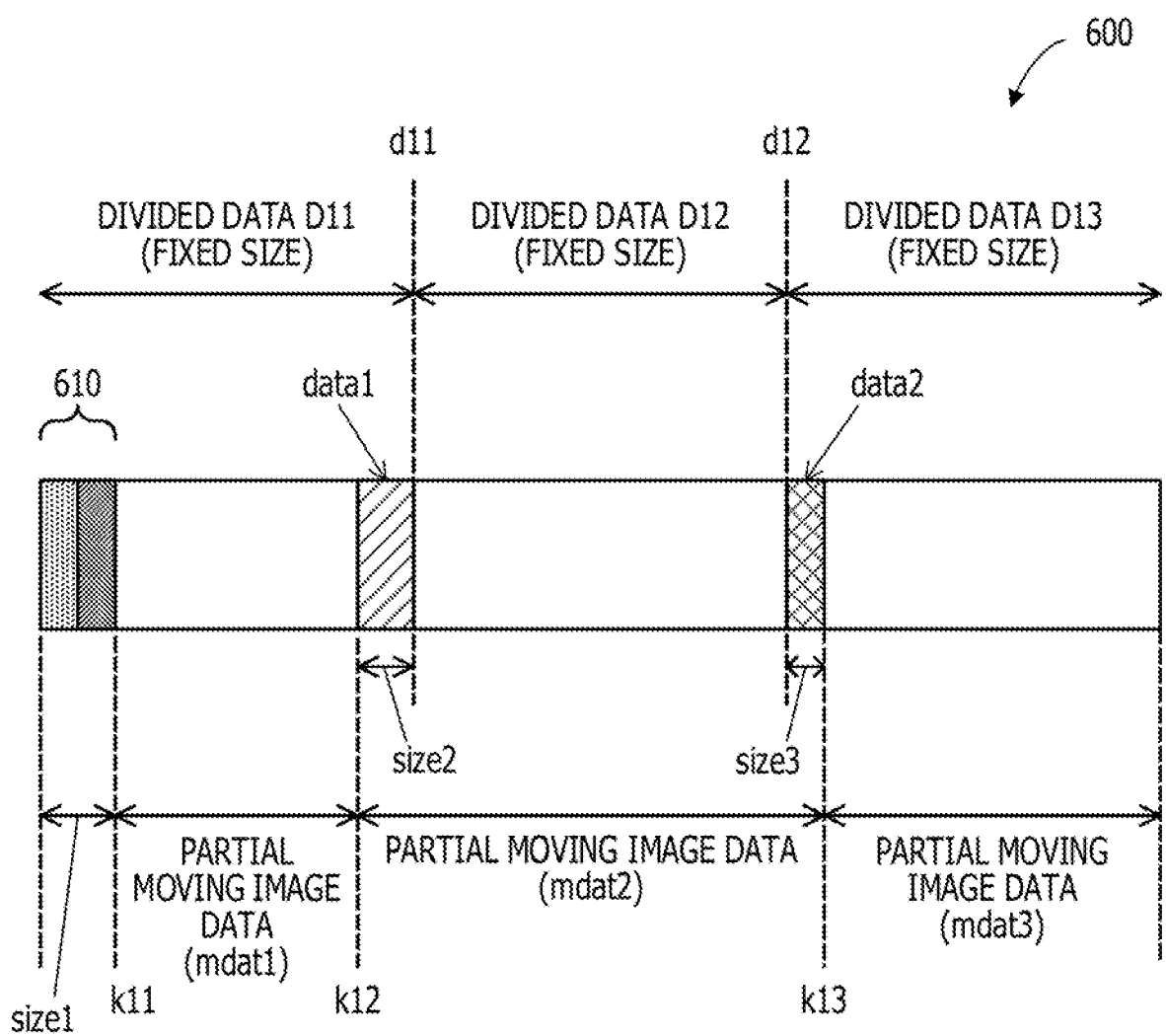
FIG. 9 is a diagram illustrating an example of division of moving image data.

FIG. 9 is a diagram illustrating an example of division of the moving image data. In the example of the second embodiment, the moving image data 600 is distributed to and arranged in the three data nodes 300, 400, and 500. For this reason, the moving image data dividing unit 125 divides the moving image data 600 into three pieces of divided data D11, D12, and D13 in units of fixed size. The sizes of the pieces of divided data D11, D12, and D13 may be the same. Although the sizes of the pieces of divided data D11 and D12 are the same, the size of the divided data D13 may be smaller than the sizes of the pieces of divided data D11 and D12.

A head position of the divided data D11 corresponds to the head position of the moving image data 600. A head position of the divided data D12 corresponds to a first division position d11. A head position of the divided data D13 corresponds to a second division position d12. An end position of the divided data D11 is (d11−1). An end position of the divided data D12 is (d12−1).

Each of the pieces of divided data D11, D12, and D13 is a file that does not function as a moving image. The pieces of divided data D12 and D13 are files in which ftyp and moov are not present, and may not be decoded. Although the divided data D11 includes ftyp and moov, that is, a pair of pieces of data called "box" exists, the moov is data generated for the entire moving image data 600 (original mdat), and is not data generated for the divided data D11. Therefore, the divided data D11 may not be decoded alone.

The difference data generation unit 128 refers to the offset information 122a to generate difference data for each of the pieces of divided data D11, D12, and D13, and may generate partial moving image data that may be independently decoded from each of the pieces of divided data D11, D12, and D13. A method for generating difference data by the difference data generation unit 128 is the same as the method for generating the first and second difference information with respect to the divided data by the processing unit 12 exemplified in the first embodiment.

That is, when a position of a neighboring key frame with respect to a head position of a certain piece of divided data is earlier than the head position of the divided data, the difference data generation unit 128 sets data from the position of the neighboring key frame to immediately before the head position as difference data to be added. When the position of the neighboring key frame with respect to the head position of the divided data is later than the head position, the difference data generation unit 128 sets a size of data from the head position to immediately before the position of the neighboring key frame as difference data of data to be deleted.

When a position of a neighboring key frame with respect to an end position of a certain piece of divided data is earlier than the end position, the difference data generation unit 128 sets a size of data from the position of the neighboring key frame to the end position as the difference data of data to be deleted. When the position of the neighboring key frame with respect to the end position of the divided data is later than the end position, the difference data generation unit 128 sets data from immediately after the end position to immediately before the position of the neighboring key frame as difference data to be added.

When an end position of a certain piece of divided data is equal to the end position of the moving image data, the difference data generation unit 128 is not required to generate difference data with respect to the end position of the divided data. For example, the difference data generation unit 128 generates difference data for the moving image data 600 as follows.

First, with respect to the divided data D11, the difference data generation unit 128 specifies a key frame position k11 closest to the head position of the divided data D11 and a key frame position k12 closest to the end position (d11−1) of the divided data D11. The key frame position k11 is later than the head position of the divided data D11. Therefore, the difference data generation unit 128 generates a size "size1" of data (not including data at the key frame position k11) between the head position of the divided data D11 and the key frame position k11 as difference data of data to be deleted from the divided data D11. The key frame position k12 is earlier than the end position (d11−1) of the divided data D11. Therefore, the difference data generation unit 128 generates a size "size2" of data between the key frame position k12 and the end position (d11−1) as difference data of data to be deleted from the divided data D11.

Data in which data of "size1" at the head of the divided data D11 and data of "size2" at the end of the divided data D11 are deleted is first partial moving image data "mdat1". The metadata generation unit 127 generates metadata segments (metadata) for the partial moving image data "mdat1". The metadata segments include "ftyp1" and "moov1". The metadata for decoding the partial moving image data may be generated using an existing method.

Second, with respect to the divided data D12, the difference data generation unit 128 specifies the key frame position k12 closest to the head position d11 of the divided data D12 and a key frame position k13 closest to the end position (d12−1) of the divided data D12. The key frame position k12 is earlier than the head position d11 of the divided data D12, Therefore, the difference data generation unit 128 generates data (not including data at the head position d11) between the key frame position k12 and the head position d11 as difference data "data1" to be added to the divided data D12. The key frame position k13 is later than the end position (d12−1) of the divided data D12. Therefore, the difference data generation unit 128 generates data (not including the data of the end position (d12−1) and the key frame position k13) between the end position (d12−1) of the divided data D12 and the key frame position k13 as difference data "data2" to be added to the divided data D12.

Second partial moving image data "mdat2" is data in which "data1" is added to the head of the divided data D12 and "data2" is added to the end of the divided data D12. The metadata generation unit 127 generates metadata segments (metadata) for the partial moving image data "mdat2". The metadata segments include "ftyp2" and "moov2".

Third, with respect to the divided data D13, the difference data generation unit 128 specifies the key frame position k13 closest to the head position d12 of the divided data D13. Since an end position of the divided data D13 corresponds to the end position of the moving image data 600, the difference data generation unit 128 is not required to generate difference data with respect to the end of the divided data D13. The key frame position k13 is later than the head position d12. Therefore, the difference data generation unit 128 generates a size "size3" of data (not including data at the key frame position k13) between the head position d12 and the key frame position k13 as difference data of data to be deleted from the divided data D13.

Data obtained by deleting the data of "size3" at the head of the divided data D13 is third partial moving image data "mdat3". The metadata generation unit 127 generates metadata segments (metadata) for the partial moving image data "mdat3". The metadata segments include "ftyp3" and "moov3".

Since "ftyp1", "ftyp2", and "ftyp3" are data indicating a file format, the data is the same as the data "ftyp". An end frame of partial moving image data may also be a B-frame. In this case, although it is considered that the last few frames of the partial moving image data may not be decoded, since the last few frames are very small part of the partial moving image data, its influence on processing such as analysis may be ignored.

FIG. 10 is a diagram illustrating an example of an arrangement data management table. An arrangement data management table 123a is stored in the arrangement data storage unit 123. The arrangement data management table 123a includes items of divided data, deletion (head), deletion (end), addition (head), addition (end), addition (ftyp), and addition (moov).

Divided data (or identification information of divided data) is registered in the item of divided data. A size of data to be deleted from a head of the corresponding divided data is registered in the item of deletion (head). A size of data to be deleted from an end of the corresponding divided data is registered in the item of deletion (end). A body (binary data) of data to be added to the head of the corresponding divided data is registered in the item of addition (head). A body (binary data) of data to be added to the end of the corresponding divided data is registered in the item of addition (end). ftyp data for decoding partial moving image data for the corresponding divided data is registered in the item of addition (ftyp). moov data for decoding the partial moving image data for the corresponding divided data is registered in the item of addition (moov).

For example, in the arrangement data management table 123a, a record is registered such that divided data is "D11", deletion (head) is "size1", deletion (end) is "size2", addition (head) is not set (no setting is indicated by "-"), addition (end) is "-", addition (ftyp) is "ftyp1" and addition (moov) is "moov1". This record indicates that the partial moving image data "mdat1" is obtained by deleting data of the size "size1" at the head and deleting data of the size "size2" at the end with respect to the divided data D11. The metadata segments indicate that the partial moving image data "mdat1" may be decoded by using "ftyp1" and "moov1".

For example, in the arrangement data management table 123a, a record is registered such that divided data is "D12", deletion (head) is "-", deletion (end) is "-", addition (head) is "data1", addition (end) is "data2", addition (ftyp) is "ftyp2", and addition (moov) is "moov2". This record indicates that the partial moving image data "mdat2" is obtained by adding data "data1" to the head and adding "data2" to the end with respect to the divided data D12. The metadata segments indicate that the partial moving image data "mdat2" may be decoded by using "ftyp2" and "moov2".

For example, in the arrangement data management table 123a, a record is registered such that divided data is "D13", deletion (head) is "size3", deletion (end) is "-", addition (head) is "-", addition (end) i"-", addition (ftyp) is "ftyp3", and addition (moov) is "moov3". This record indicates that the partial moving image data "mdat3" is obtained by deleting data of the size "size3" at the head with respect to the divided data D13. The metadata segments indicate that the partial moving image data "mdat3" may be decoded by using "ftyp3" and "moov3".

FIG. 11 is a diagram illustrating an example of a data management table. A data management table 211 is stored in the management data storage unit 210. The data management table 211 includes items of a moving image file name, a divided data identifier (ID), and a storage location.

A name of the moving image data is registered in the item of the moving image file name, Identification information (divided data ID) of each piece of divided data obtained by dividing the moving image data is registered in the item of the divided data ID. For example, the divided data ID corresponds to an order of division (the divided data ID may be assigned so as to indicate an order of division). A path indicating a storage destination of the corresponding divided data is registered in the item of the storage location. The path includes information about identification information of a data node and a storage location (directory or the like) of the divided data in the data node.

For example, in the data management table 211, a record is registered such that a moving image file name is "F1", a divided data ID is "ID1", and a storage location is "DataNode1". This record indicates that the divided data D11 identified by "ID1" of the moving image data 600 having the moving image file name "F1" is stored in the storage location "DataNode1". The storage location "DataNode1" indicates a predetermined directory of the data node 300.

Similarly, the data management table 211 indicates that the divided data D12 ("ID2") corresponding to the moving image data 600 is stored in the data node 400, and that the divided data D13 ("ID3") corresponding to the moving image data 600 is stored in the data node 500.

FIG. 12 is a diagram illustrating an example of data arrangement for data nodes. The data arrangement unit 129 arranges the divided data D11 in the data node 300, and also arranges difference data and metadata generated for the divided data D11 in the data node 300. The data node 300 holds a data set 311 including the divided data D1, size1, size2, ftyp1, and moov1. The data set 311 includes information indicating how to apply the difference data to the divided data D11. size1 is a size of data to be deleted from the head of the divided data D1i. size2 is a size of data to be deleted from the end of the divided data D11. ftyp1 and moov1 are metadata (metadata for decoding), and are used to decode the partial moving image data (mdat1) obtained by deleting data of size1 from the head of the divided data D11 and deleting data of size2 from the end.

The data arrangement unit 129 arranges the divided data D12 in the data node 400 and also arranges difference data and metadata generated for the divided data D12 in the data node 400. The data node 400 holds a data set 411 including the divided data D12, data1, data2, ftyp2, and moov2. The data set 411 includes information indicating how to apply the difference data to the divided data D12. data1 is data to be added to the head of the divided data D12. data2 is data to be added to the end of the divided data D12. ftyp2 and moov2 are metadata, and are used to decode the partial moving image data (mdat2) obtained by adding data1 to the head of the divided data D12 and adding data2 to the end.

The data arrangement unit 129 arranges the divided data D13 in the data node 500, and also arranges difference data and metadata generated for the divided data D13 in the data node 500. The data node 500 holds a data set 511 including the divided data D13, size3, ftyp3, and moov3. The data set 511 includes information indicating how to apply the difference data to the divided data D13. size3 is a size of data to be deleted from the head of the divided data D13. ftyp3 and the moov3 are metadata, and are used to decode the partial moving image data (mdat3) obtained by deleting data of size3 from the head of the divided data D13.

Figure 13:
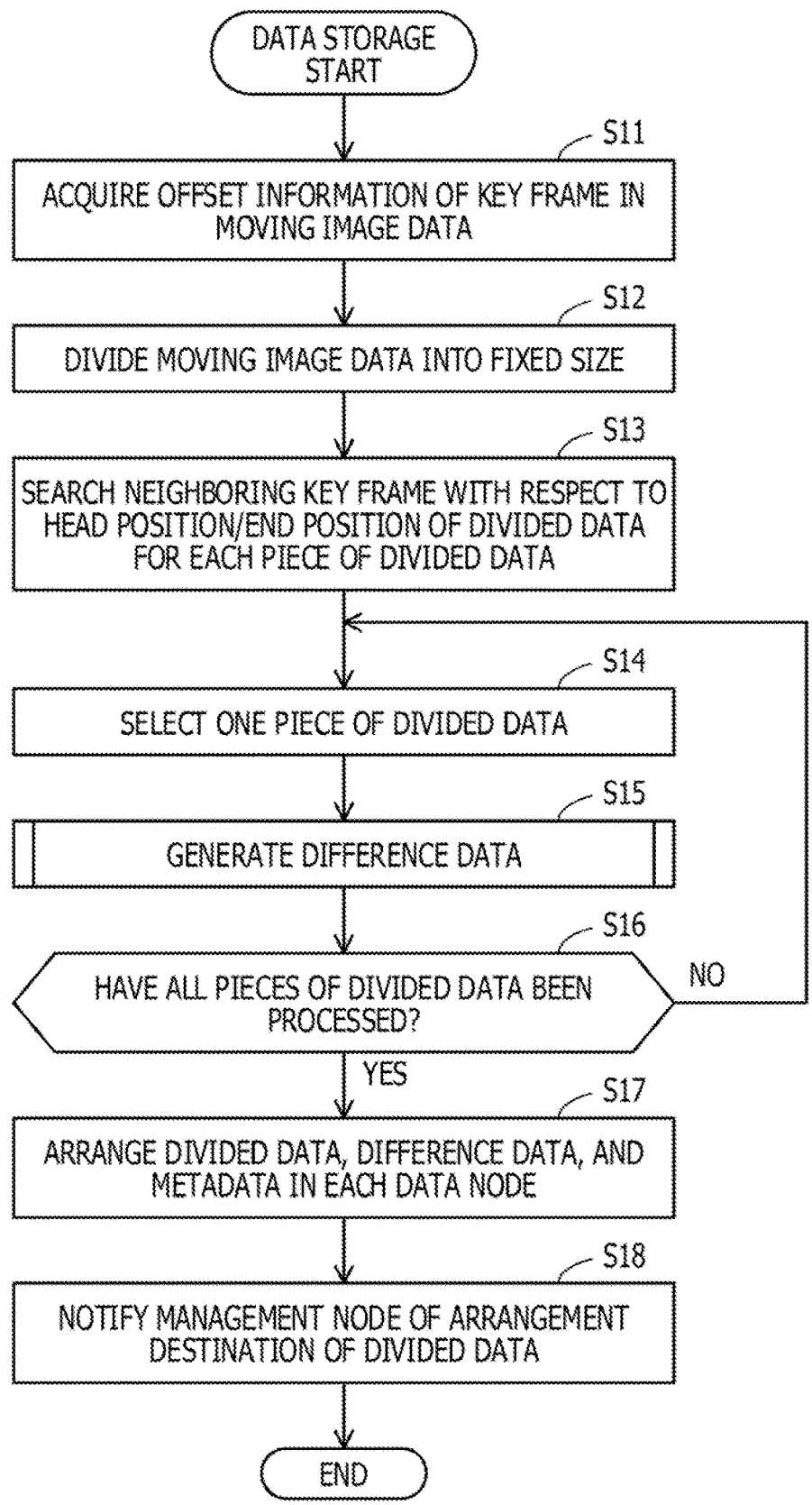
FIG. 13 is a flowchart illustrating an example of data storage.

Next, a procedure of processing performed by the client 100 will be described. First, a procedure for storing moving image data will be described. FIG. 13 is a flowchart illustrating an example of the data storage.

(S11) When the moving image data 600 to be stored is designated by a user, the key frame offset acquisition unit 124 acquires the offset information 122a of the key frame from the moov data of the moving image data 600, and stores the offset information in the offset information storage unit 122.

(S12) The moving image data dividing unit 125 divides the moving image data 600 into a fixed size to generate the pieces of divided data D11, D12, and D13, and stores the pieces of divided data D11, D12, and D13 in the arrangement data storage unit 123. The fixed size may be arbitrarily determined by the user.

(S13) The neighboring key frame acquisition unit 126 refers to the offset information 122a stored in the offset information storage unit 122, and searches a key frame (neighboring key frame) closest to the head position/the end position of the divided data, for each piece of divided data. The neighboring key frame acquisition unit 126 provides the acquired offset position of the neighboring key frame to the metadata generation unit 127 and the difference data generation unit 128.

(S14) The difference data generation unit 128 selects one piece of divided data.

(S15) The difference data generation unit 128 (and the metadata generation unit 127) executes difference data generation. Details of the difference data generation will be described later.

(S16) The difference data generation unit 128 determines whether or not the processing of generating the difference data is performed for all the pieces of divided data of the moving image data 600. When all the pieces of divided data have been processed, the processing proceeds to step S17. When there is any unprocessed divided data, the processing proceeds to step S14.

(S17) The data arrangement unit 129 arranges the divided data, and the difference data and the metadata corresponding to the divided data, in each data node.

(S18) The data arrangement unit 129 notifies the data management node 200 of an arrangement destination of the divided data. The processing of the data storage is completed.

Figure 14:
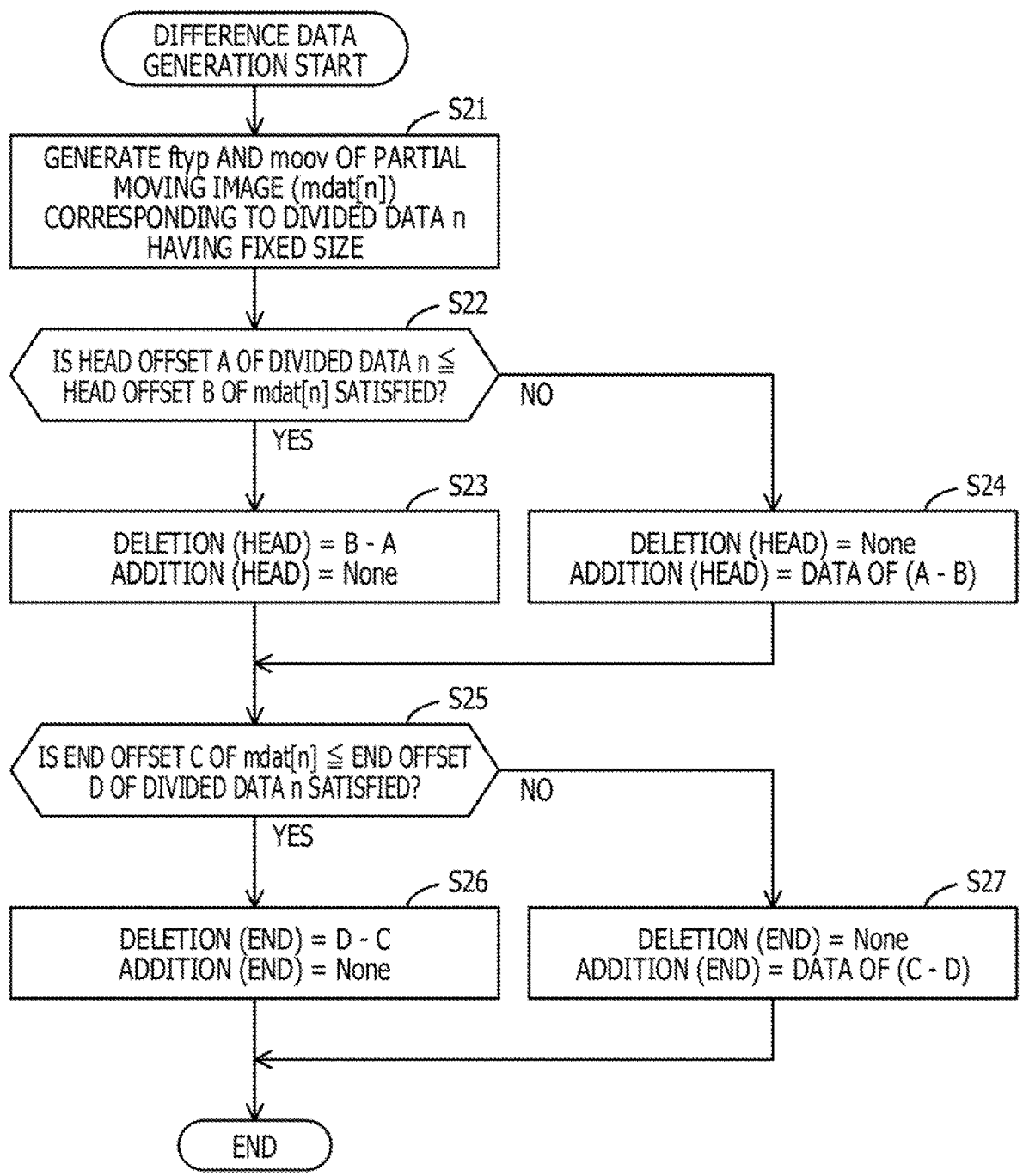
FIG. 14 is a flowchart illustrating an example of difference data generation.

FIG. 14 is a flowchart illustrating an example of difference data generation. The difference data generation corresponds to step S15.

(S21) The metadata generation unit 127 generates ftyp and moov of partial moving image data (mdat[n]) corresponding to the divided data n (divided data selected in step S14) of the fixed size. For example, the metadata generation unit 127 may specify a range of the partial moving image data (mdat[n]) corresponding to the divided data n of the moving image data 600 based on an offset position of a neighboring key frame provided from the neighboring key frame acquisition unit 126. Therefore, the metadata generation unit 127 generates moov for the range of the partial moving image data based on the moving image data 600. ftyp may be the same as ftyp of the moving image data 600. The metadata generation unit 127 stores the generated metadata, in association with the divided data n, in the arrangement data storage unit 123.

(S22) The difference data generation unit 128 determines whether or not a head offset A of the divided data n is equal to or less than a head offset B of mdat[n] (A≤B). In a case of A≤B, the processing proceeds to step S23. In a case of A>B, the processing proceeds to step S24.

(S23) The difference data generation unit 128 sets a size of data to be deleted from the head of the divided data n to "B−A" (deletion (head)=B−A), and generates difference data indicating the size of data. The difference data generation unit 128 sets data to be added to the head of the divided data n to "None" (corresponding to no setting "-" described above). The difference data generation unit 128 stores the generated difference data, in association with the divided data n, in the arrangement data storage unit 123. The processing proceeds to step S25.

(S24) The difference data generation unit 128 sets a size of data to be deleted from the head of the divided data to "None". The difference data generation unit 128 sets data to be added to the head of the divided data n to "data of (A−B)", and generates difference data indicating the data. "Data of (A−B)" indicates data between the offset B and the offset A in the moving image data 600. The difference data generation unit 128 stores the generated difference data, in association with the divided data n, in the arrangement data storage unit 123. The processing proceeds to step S25.

(S25) The difference data generation unit 128 determines whether or not an end offset C of mdat[n] is equal to or less than an end offset D of the divided data n (C≤D). In a case of C≤D, the processing proceeds to step S26. In a case of C>D, the processing proceeds to step S27.

(S26) The difference data generation unit 128 sets a size of data to be deleted from the end of the divided data n to "D−C" (deletion (end)=D−C), and generates difference data indicating the size. The difference data generation unit 128 sets data to be added to the end of the divided data n to "None". The difference data generation unit 128 stores the generated difference data, in association with the divided data n, in the arrangement data storage unit 123. The processing of generating the difference data with respect to the divided data n is completed.

(S27) The difference data generation unit 128 sets a size of data to be deleted from the end of the divided data n to "None". The difference data generation unit 128 sets data to be added to the end of the divided data n to "data of (C−D)", and generates difference data indicating the data. "Data of (C−D)" indicates data between the offset D and the offset C of the moving image data 600. The difference data generation unit 128 stores the generated difference data, in association with the divided data n, in the arrangement data storage unit 123. The processing of generating the difference data with respect to the divided data n is completed.

The above description exemplifies a procedure that the client 100 generates the difference data when receiving the moving image data 600 to be stored, and arranges the difference data and the metadata together with the pieces of divided data D11, D12, and D13 in the data nodes 300, 400, and 500, respectively, in a distributed manner, but other procedures may be considered. For example, the client 100 may generate pieces of difference data and metadata after arranging the pieces of divided data D11, D12, and D13 in the data nodes 300, 400, and 500 in the distributed manner, and may arrange the pieces of difference data and metadata in the data nodes 300, 400, and 500. In this case, the client 100 may hold the moving image data 600 until the pieces of difference data and metadata are generated. The client 100 may obtain the pieces of divided data D11, D12, and D13 from the data nodes 300, 400, and 500, respectively and may generate the pieces of difference data and metadata, when a system load is comparatively small after the pieces of divided data D11, D12, and D13 are arranged in a distributed manner.

Figure 15:
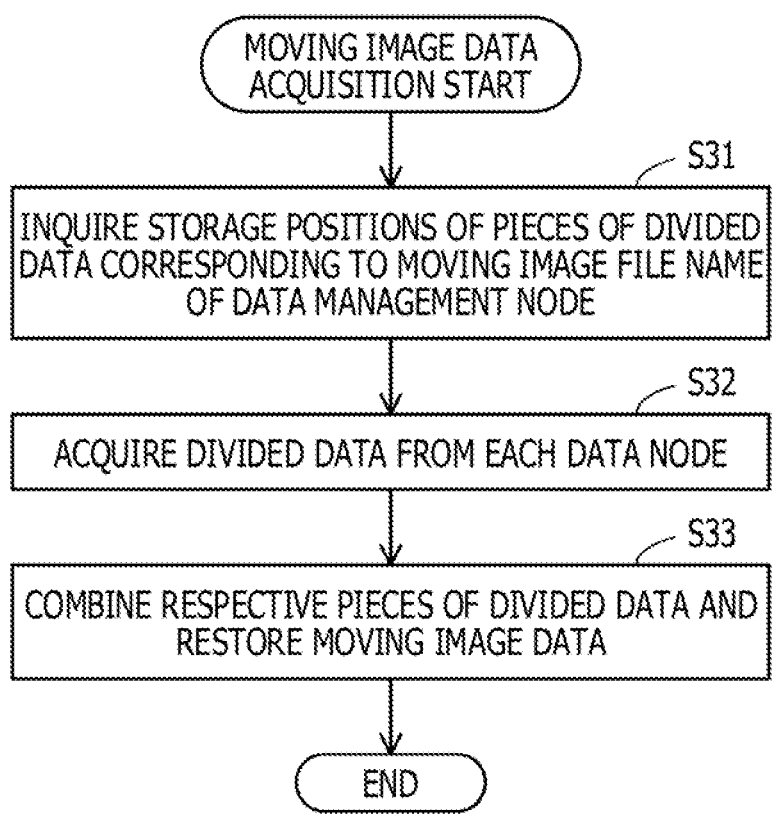
FIG. 15 is a flowchart illustrating an example of moving image data acquisition.

Next, a procedure for acquiring the moving image data based on the pieces of divided data will be described. FIG. 15 is a flowchart illustrating an example of the moving image data acquisition.

(S31) The moving image data acquisition unit 130 accepts the moving image file name of the moving image data 600 to be acquired. Then, the moving image data acquisition unit 130 inquires the moving image file name of the data management node 200, and acquires the storage positions of the pieces of divided data D11, D12, and D13 corresponding to the moving image file name from the data management node 200. The storage position of the divided data D11 indicates a predetermined directory of the data node 300. The storage position of the divided data D12 indicates a predetermined directory of the data node 400. The storage position of the divided data D13 indicates a predetermined directory of the data node 500.

(S32) The moving image data acquisition unit 130 acquires the pieces of divided data D11, D12, and D13 from the data nodes 300, 400, and 500, respectively.

(S33) The moving image data acquisition unit 130 restores the moving image data 600 by combining the pieces of divided data D11, D12, and D13 in the same order as the division order. Then, the processing for acquiring the moving image data is completed.

As described above, when receiving an instruction to acquire moving image data, the moving image data acquisition unit 130 acquires a plurality of pieces of divided data from a plurality of data nodes, and combines the plurality of pieces of divided data to restore the moving image data. At this time, since editing processing is not required to be performed on the divided data, the moving image data may be acquired at high speed.

Figure 16:
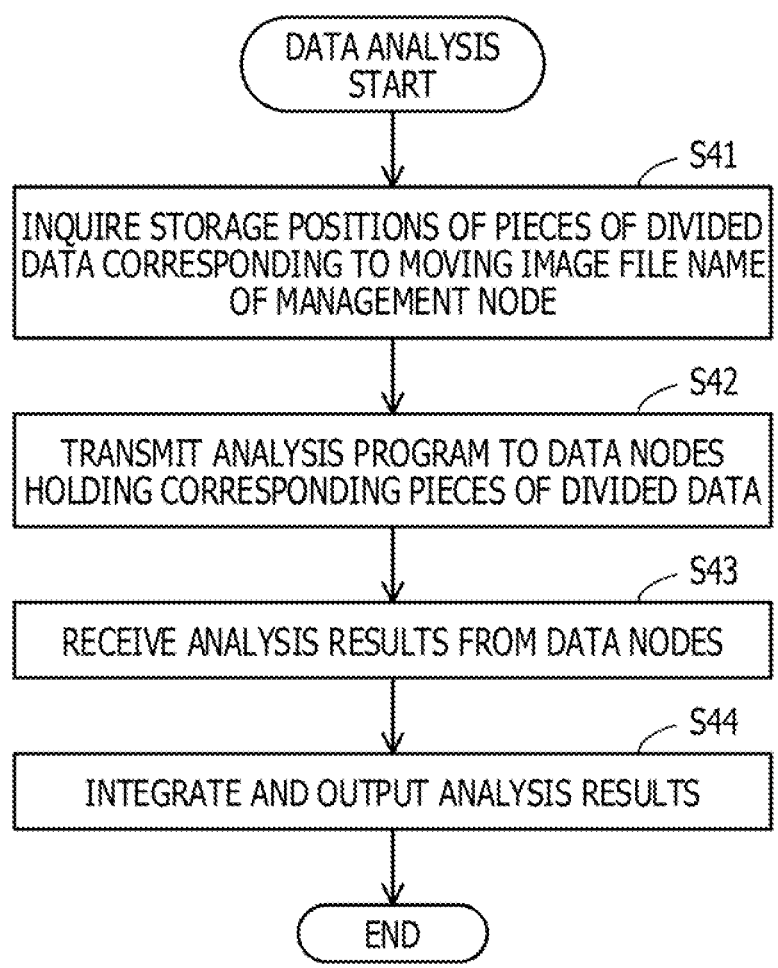
FIG. 16 is a flowchart illustrating an example of data analysis.

Next, a procedure for analyzing the moving image data will be described. FIG. 16 is a flowchart illustrating an example of the data analysis.

(S41) The analysis control unit 140 accepts the moving image file name of the moving image data 600 to be analyzed. The analysis control unit 140 inquires the moving image file name of the data management node 200, and acquires the storage positions of the pieces of divided data D11, D12, and D13 corresponding to the moving image file name from the data management node 200.

(S42) The analysis control unit 140 acquires a program for analysis from a program storage unit in the HDD 103, and transmits the program to the data nodes 300, 400, and 500. The analysis control unit 140 instructs the data nodes 300, 400, and 500 to execute the program. In the data nodes 300, 400, and 500, the partial moving image data is generated from the divided data and the difference data, and the analysis according to the program is executed.

(S43) The analysis control unit 140 receives analysis results from the data nodes 300, 400, and 500.

(S44) The analysis control unit 140 integrates the analysis results acquired from the data nodes 300, 400, and 500 to generate result information, and outputs the result information. The processing of the data analysis is completed.

Next, a processing procedure in the data nodes 300, 400, and 500 during analysis will be described. The data node 300 will be exemplified and described below, but the data nodes 400, and 500 also perform the same procedure.

Figure 17:
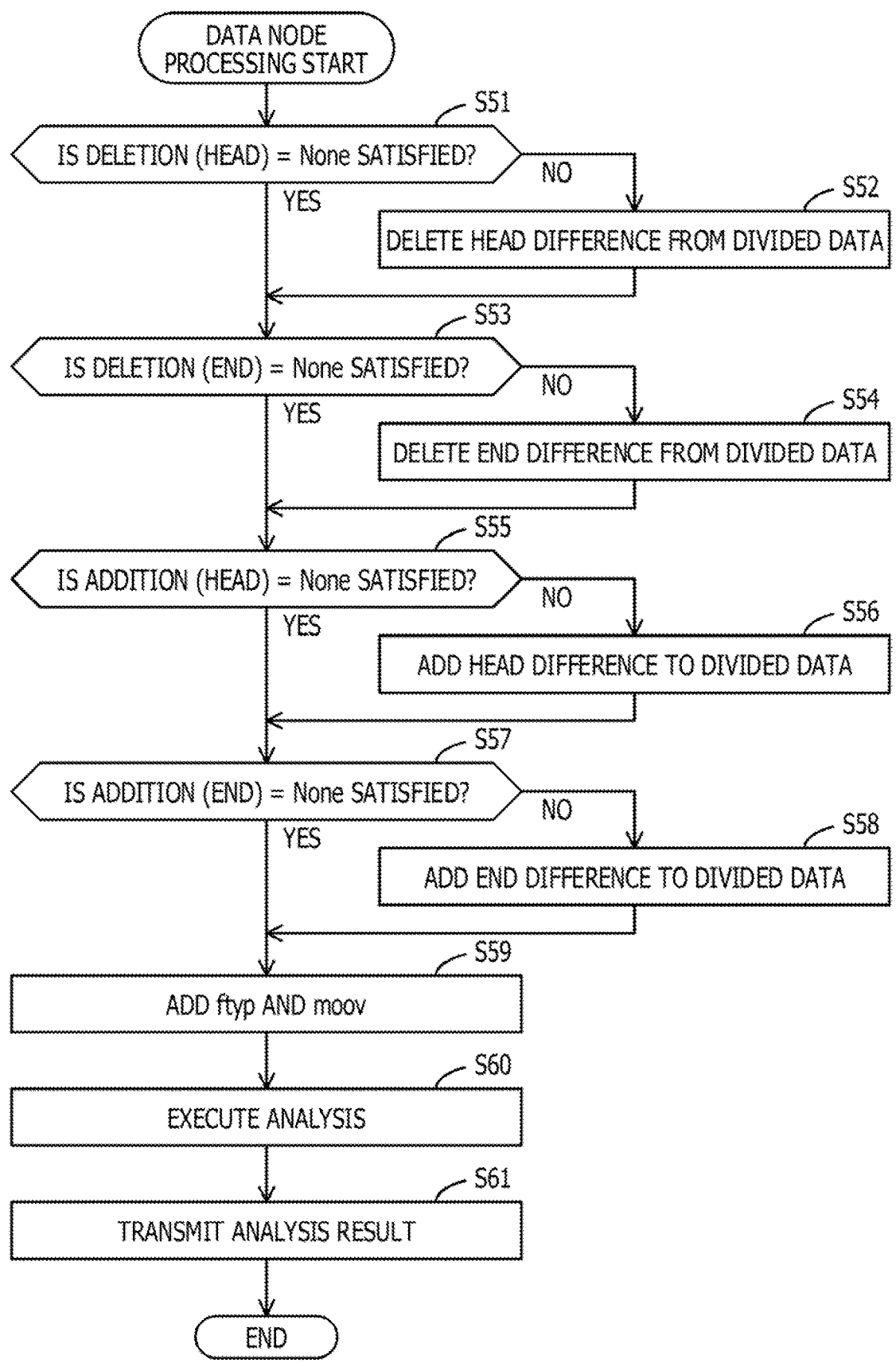
FIG. 17 is a flowchart illustrating an example of processing in a data node.

FIG. 17 is a flowchart illustrating an example of the data node processing. The data processing unit 330 performs a procedure of steps S51 to S59 to be described below based on information of a method of applying the data set 311 held by the data node 300 and the difference data notified from the client 100 to the divided data.

(S51) The data processing unit 330 determines whether or not the size (that is, deletion (head)) of data to be deleted from the head of the divided data (for example, the divided data D11) is "None" (that is, "-"). In a case of deletion (head)=None, the processing proceeds to step S53. In a case of deletion (head)≠None, the processing proceeds to step S52.

(S52) The data processing unit 330 deletes the head difference (data corresponding to the size indicated by the difference data) from the divided data (for example, the divided data D11). The processing proceeds to step S53.

(S53) The data processing unit 330 determines whether or not the size (deletion (end)) of the data to be deleted from the end of the divided data is "None". In a case of deletion (end)=None, the processing proceeds to step S55. In a case of deletion (end)≠None, the processing proceeds to step S54.

(S54) The data processing unit 330 deletes the end difference (data corresponding to the size indicated by the difference data) from the divided data. The processing proceeds to step S55.

(S55) The data processing unit 330 determines whether or not data to be added to the head of the divided data (addition (head)) is "None", In a case of addition (head)=None, the processing proceeds to step S57. In a case of addition (head)≠None, the processing proceeds to step S56.

(S56) The data processing unit 330 adds the difference data to the head of the divided data. The processing proceeds to step S57.

(S57) The data processing unit 330 determines whether or not data to be added to the end of the divided data (addition (end)) is "None". In a case of addition (end)=None, the processing proceeds to step S59. In a case of addition (end)≠None, the processing proceeds to step S58.

(S58) The data processing unit 330 adds the difference data to the end of the divided data. The processing proceeds to step S59.

(S59) The data processing unit 330 adds ftyp (for example, ftyp1) and moov (for example, moov1) corresponding to the corresponding divided data, to the partial moving image data generated by the procedure of steps S51 to S58.

(S60) The data processing unit 330 decodes the partial moving image data, and analyzes the partial moving image data. For example, the data processing unit 330 analyzes a shape and movement of an object drawn by the partial moving image data, and records a name or the like of the recognized object as an analysis result.

(S61) The data processing unit 330 transmits the analysis result to the client 100. Various methods are usable for the analysis. For example, in analysis for automatically recognizing an object appearing in a video image, it is considered that the data processing unit 330 may use a method for adding information about the recognized object to an analysis result file by text or the like. For example, in a case of a process of generating a thumbnail, the data processing unit 330 may store an image file generated in the same directory as an analysis result. The client 100 acquires the analysis result from each data node, integrates the analysis results in a time-series order or the like to generate an analysis result for the entire moving image data 600, and outputs the analysis result.

According to the client 100, it is possible to suppress degradation in utilization efficiency of storage capacity and to perform the distributed processing for the moving image data. Specifically, for example, the distributed processing is performed as follows. The data nodes 300, 400, and 500 is used for storing the moving image data 600. Therefore, when the user requires to acquire the moving image data 600, it is preferable that the moving image data 600 may be acquired at high speed. In this regard, the client 100 stores the pieces of divided data D11, D12, and D13 obtained by simply dividing the moving image data 600 in a predetermined size unit, in the data nodes 300, 400, and 500, respectively. Therefore, the client 100 may acquire the pieces of divided data D11, D12, and D13 stored in the data nodes 300, 400, and 500 and combine them in the order of division, so that the moving image data 600 may be acquired at high speed because the moving image data 600 is not required to perform other editing processing.

The data nodes 300, 400, and 500 may generate mdat1, mdat2, mdat3 by applying the pieces of difference data arranged in the data nodes 300, 400, and 500 to the pieces of divided data, and may generate the pieces of partial moving image data which may be independently decoded by applying each piece of metadata. For this reason, when the moving image data 600 is analyzed, each of the data nodes 300, 400, and 500 may perform processing such as analysis to the generated partial moving image data in a distributed manner. A method of applying the difference data to the divided data held by each of the data nodes 300, 400, and 500 is instructed by the client 100. For example, the client 100 transmits a program for causing the analysis processing to be executed to the data nodes 300, 400, and 500. In this case, the data nodes 300, 400, and 500 executes the program to analyze the partial moving image data held by each node itself.

In this way, the processing such as the analysis for the moving image data 600 may be executed in a distributed manner, so that the processing speed may be increased. By the method of the neighborhood processing, the analysis of the partial moving image data is performed by each data node which holds the partial moving image data in the distributed manner, whereby communication for analysis between the data nodes or between each data node and the client 100 may be reduced, and the processing may be further speeded up.

In particular, for example, it is only required to arrange the difference data to be used to generate the partial moving image data from the divided data and the metadata for restoring the partial moving image data in the data nodes 300, 400, and 500, and it is not required to arrange all the partial moving image data. Therefore, the storage capacity to be used in each of the data nodes may be reduced than that in a case where both the divided data and the partial moving image data are arranged in each data node. Thus, it is possible to suppress degradation in utilization efficiency of the storage capacity of each data node and to perform the distributed processing for the moving image data.

The information processing of the first embodiment may be enabled by causing the processing unit 12 to execute a program. The information processing of the second embodiment may be enabled by causing the CPU 101 to execute a program. The program may be recorded in the recording medium 113 that is computer-readable.

For example, it is possible to circulate the program by distributing the recording medium 113 in which the program is recorded. The program may be stored in another computer and distributed through a network. For example, the computer may store (install), in a storage device such as the RAM 102 or the HDD 103, the program recorded in the recording medium 113 or the program received from the other computer, and may read the program from the storage device to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. An information processing system comprising:
one or more memories configured to store offset information indicating a position of a key point in data; and
one or more processors coupled to the one or more memories and the one or more processors configured to:
acquire a plurality of pieces of divided data generated by dividing the data in accordance with a specific size,
determine, in accordance with the offset information, a first position of a first key point closest to a head position of each of the plurality of pieces of divided data, and a second position of a second key point closest to an end position of each of the plurality of pieces of divided data,
generate, for each of the plurality of pieces of divided data, first difference information indicating first data between the head position and the first position, and second difference information indicating second data between the end position and the second position,
generate, each of the plurality of pieces of divided data, metadata to be used for decoding partial data generated by applying the first difference information and the second difference information to each of the plurality of pieces of divided data, and
distribute the plurality of pieces of divided data to a plurality of nodes respectively together with the first difference information, the second difference information, and the metadata,
in response to receiving an analysis instruction for the data, cause each of the plurality of nodes to generate the partial data based on each of the plurality of pieces of divided data, the first difference information, the second difference information, and the metadata, and to perform analysis of the partial data, and
acquire a result of the analysis from each of the plurality of nodes.

2. The information processing system according to claim 1, wherein
the data includes a plurality of frames encoded in time series, and
the key point is a key frame.

3. The information processing system according to claim 1, wherein the one or more processors are configured to,
in response to receiving an acquisition instruction for the data, acquire the plurality of pieces of divided data from the plurality of nodes respectively, and
combine the plurality of pieces of divided data to restore the data.

4. The information processing system according to claim 1, wherein
when the head position of a first piece of divided data of the plurality of pieces of divided data is prior to the first position, the first difference information is a size of the first data to be deleted from the first piece of divided data for generating the partial data, and
when the head position of the first piece of divided data is later than the first position, the first difference information is the first data to be added into the first piece of divided data for generating the partial data.

5. The information processing system according to claim 1, wherein
when the end position of a first piece of divided data of the plurality of pieces of divided data is prior to the second position, the second difference information is the second data to be added into the first piece of divided data for generating the partial data, and
when the end position of the first piece of divided data is later than the second position, the second difference information is a size of the second data to be deleted from the first piece of divided data for generating the partial data.

6. The information processing system according to claim 1, wherein when the end position of a first piece of divided data of the plurality of pieces of divided data corresponds to an end of the data, the second difference information indicates the second data including no data.

7. A computer-implemented information processing method comprising:
acquiring a plurality of pieces of divided data generated by dividing data in accordance with a specific size;
determining, in accordance with offset information indicating a position of a key point in the data, a first position of a first key point closest to a head position of each of the plurality of pieces of divided data, and a second position of a second key point closest to an end position of each of the plurality of pieces of divided data;

generating, for each of the plurality of pieces of divided data, first difference information indicating first data between the head position and the first position, and second difference information indicating second data between the end position and the second position;

generating, each of the plurality of pieces of divided data, metadata to be used for decoding partial data generated by applying the first difference information and the second difference information to each of the plurality of pieces of divided data; and distributing the plurality of pieces of divided data to a plurality of nodes respectively together with the first difference information, the second difference information, and the metadata, in response to receiving an analysis instruction for the data, causing each of the plurality of nodes to generate the partial data based on each of the plurality of pieces of divided data, the first difference information, the second difference information, and the metadata, and to perform analysis of the partial data; and acquiring a result of the analysis from each of the plurality of nodes.

8. The information processing method according to claim 7, wherein the data includes a plurality of frames encoded in time series, and the key point is a key frame.

9. The information processing method according to claim 7, further comprising:

in response to receiving an acquisition instruction for the data, acquiring the plurality of pieces of divided data from the plurality of nodes respectively; and combining the plurality of pieces of divided data to restore the data.

10. The information processing method according to claim 7, wherein when the head position of a first piece of divided data of the plurality of pieces of divided data is prior to the first position, the first difference information is a size of the first data to be deleted from the first piece of divided data for generating the partial data, and when the head position of the first piece of divided data is later than the first position, the first difference information is the first data to be added into the first piece of divided data for generating the partial data.

11. The information processing method according to claim 7, wherein when the end position of a first piece of divided data of the plurality of pieces of divided data is prior to the second position, the second difference information is the second data to be added into the first piece of divided data for generating the partial data, and when the end position of the first piece of divided data is later than the second position, the second difference information is a size of the second data to be deleted from the first piece of divided data for generating the partial data.

12. The information processing method according to claim 7, wherein when the end position of a first piece of divided data of the plurality of pieces of divided data corresponds to an end of the data, the second difference information indicates the second data including no data.

13. A non-transitory computer-readable medium storing a program executable by one or more computers, the program comprising:

one or more instructions for acquiring a plurality of pieces of divided data generated by dividing data in accordance with a specific size;

one or more instructions for determining, in accordance with offset information indicating a position of a key point in the data, a first position of a first key point closest to a head position of each of the plurality of pieces of divided data, and a second position of a second key point closest to an end position of each of the plurality of pieces of divided data;

one or more instructions for generating, for each of the plurality of pieces of divided data, first difference information indicating first data between the head position and the first position, and second difference information indicating second data between the end position and the second position;

one or more instructions for generating, each of the plurality of pieces of divided data, metadata to be used for decoding partial data generated by applying the first difference information and the second difference information to each of the plurality of pieces of divided data; and one or more instructions for distributing the plurality of pieces of divided data to a plurality of nodes respectively together with the first difference information, the second difference information, and the metadata, one or more instructions for, in response to receiving an analysis instruction for the data, causing each of the plurality of nodes to generate the partial data based on each of the plurality of pieces of divided data, the first difference information, the second difference information, and the metadata, and to perform analysis of the partial data; and one or more instructions for acquiring a result of the analysis from each of the plurality of nodes.

* * * * *